United States Patent
Kar et al.

(10) Patent No.: US 8,630,412 B2
(45) Date of Patent: Jan. 14, 2014

(54) TRANSPORT OF PARTIALLY ENCRYPTED MEDIA

(75) Inventors: Mukta Kar, Louisville, CO (US); Mandayam A. Narasimhan, San Diego, CA (US)

(73) Assignees: Motorola Mobility LLC, Libertyville, IL (US); Cable Television Laboratories, Inc., Louisville, CO (US)

( * ) Notice: Subject to any disclaimer, the term of this patent is extended or adjusted under 35 U.S.C. 154(b) by 311 days.

(21) Appl. No.: 12/868,082

(22) Filed: Aug. 25, 2010

(65) Prior Publication Data

US 2012/0051539 A1    Mar. 1, 2012

(51) Int. Cl.
*H04L 29/06* (2006.01)

(52) U.S. Cl.
USPC ............................................. 380/200

(58) Field of Classification Search
USPC .......... 380/200, 204, 212, 213; 713/160, 168; 386/330
See application file for complete search history.

(56) References Cited

U.S. PATENT DOCUMENTS

| | | | |
|---|---|---|---|
| 6,178,512 B1 * | 1/2001 | Fifield | 726/1 |
| 8,243,921 B1 * | 8/2012 | Ryal | 380/200 |
| 2003/0169368 A1 * | 9/2003 | Hamada et al. | 348/465 |
| 2004/0064688 A1 * | 4/2004 | Jacobs | 713/150 |
| 2004/0196975 A1 * | 10/2004 | Zhu et al. | 380/258 |
| 2005/0069132 A1 * | 3/2005 | Sakai | 380/239 |
| 2005/0157714 A1 * | 7/2005 | Shlissel et al. | 370/389 |
| 2006/0050880 A1 * | 3/2006 | Taylor et al. | 380/203 |
| 2006/0209709 A1 * | 9/2006 | Kovacevic | 370/252 |
| 2007/0006253 A1 | 1/2007 | Pinder et al. | |
| 2007/0041716 A1 * | 2/2007 | Van Gestel | 386/112 |
| 2007/0162981 A1 * | 7/2007 | Morioka et al. | 726/30 |
| 2007/0268979 A1 * | 11/2007 | Chang et al. | 375/265 |
| 2007/0291942 A1 * | 12/2007 | Candelore et al. | 380/216 |
| 2008/0137847 A1 * | 6/2008 | Candelore et al. | 380/200 |
| 2008/0291842 A1 * | 11/2008 | Isambart et al. | 370/252 |
| 2009/0135849 A1 * | 5/2009 | Alkove et al. | 370/465 |
| 2009/0213940 A1 * | 8/2009 | Steinbach et al. | 375/240.27 |
| 2009/0225983 A1 * | 9/2009 | Reinoso et al. | 380/212 |
| 2009/0271832 A1 * | 10/2009 | Park et al. | 725/98 |
| 2010/0104006 A1 * | 4/2010 | Taylor et al. | 375/240.2 |
| 2010/0189254 A1 * | 7/2010 | Candelore et al. | 380/210 |

FOREIGN PATENT DOCUMENTS

| | | |
|---|---|---|
| WO | 02/15579 A1 | 2/2002 |
| WO | 2010/000692 A1 | 1/2010 |

OTHER PUBLICATIONS

International Search Report from corresponding PCT Application Serial No. PCT/US2011/049074 dated Feb. 24, 2012, 14 pages.

* cited by examiner

*Primary Examiner* — Michael S McNally
(74) *Attorney, Agent, or Firm* — Mayer & Williams PC; Stuart H. Mayer

(57) ABSTRACT

A method of facilitating transport of partially encrypted video is disclosed. The method re-packetizes or otherwise de-concatenates packets carrying the partially encrypted video into packets where all the video in each packet is either encrypted or unencrypted. The re-packetized video packets may include data that identifies whether the packet is carrying encrypted or unencrypted video.

27 Claims, 3 Drawing Sheets

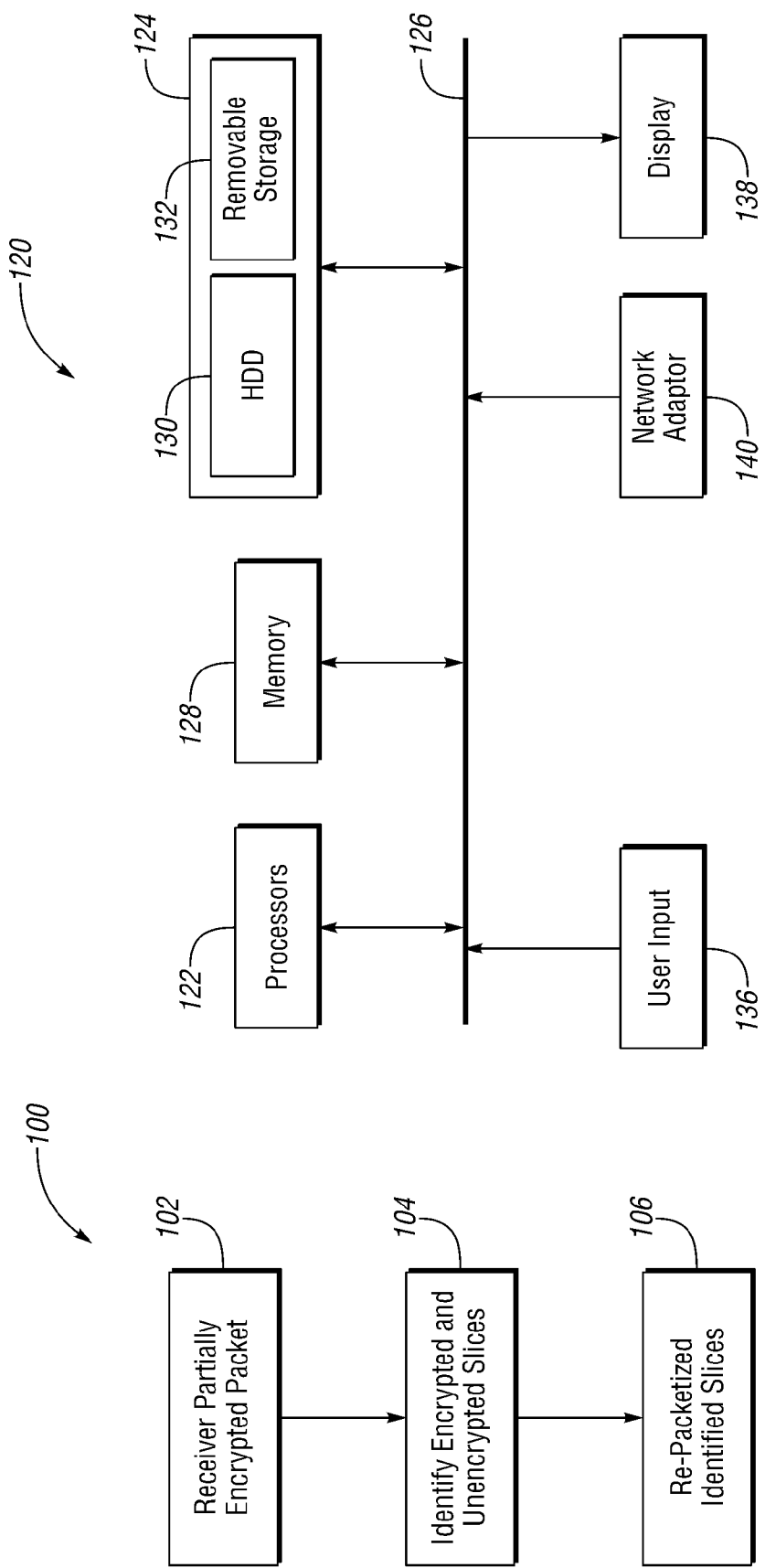

TRANSPORT OF PARTIALLY ENCRYPTED MEDIA

TECHNICAL FIELD

The present invention relates to methods and systems of facilitating playback and transport of partially encrypted media, such as, but not limited video partially encrypted according to advance video coding (AVC).

BACKGROUND

Protection of digital media has become very important to content owners as a copy of a digital media is the same as its original in every aspect. At present, television content is encrypted at the source of origin, and thereafter is decrypted and re-encrypted one or more times on its way from source of origin (studio) to the end-user. In some cases, the studio's distribution system may be different from an encryption system used in a delivery network of a service provider. As a result, for example with respect to television, most television content is decrypted, goes through minimal processing, and then is re-encrypted before delivery to subscriber user devices.

The process of decryption and re-encryption at the service providers' end or at any other point in distribution/delivery chain, other than the end-user's device, is a concern for the owner of the content as it becomes vulnerable to illegal copying and distribution in the consumer market place by rogue businesses. However, if the content can be encrypted only once at the source of origin and decrypted only at the end-user devices, and no decryption and re-encryption takes place in the middle of distribution/delivery network, the process may alleviate content owner concerns with the distribution/delivery chain. In addition, the process may also save some cost associated with decryption and re-encryption equipment used at the service provider's facilities.

To alleviate the need for decryption at any point in the distribution/delivery chain other than at the end-user device, storage and distribution of partially encrypted advanced video coding (AVC) video access units have been proposed in Microsoft's Protected Interoperable File Format (PIFF). It may be necessary to store and distribute partially encrypted video as opposed to encryption of entire video access unit or all bytes of slice NAL units, such as to adapt the video content to various video applications, particularly broadcast applications, where some information about video characteristics may be necessary at the service provider's plant before being delivered to consumers.

In the case of AVC video, this information may be available at a beginning of each packet within bytes (from a few bytes to 100 bytes) of the video access unit including the slice header. The bytes at the start of a video access unit may be kept in a clear (unencrypted) state while some or all of the rest of the slice may be encrypted. The small number of clear bytes at the start of an access unit may not be sufficient for an AVC decoder to identify the portions of the packet that are encrypted and the portions that are not. This may make it difficult for the decoder to decode the entire compressed slice and generate a continuous video experience. By keeping the video slices partially encrypted, it ensures that at no point in the delivery chain do the media need decryption and re-encryption. The decryption only happens at the consumer's devices.

To deal with partially encrypted slices, additional information related to how many bytes are in clear in each slice or the location of starting bytes of the encrypted part of the slice has to be available to the decoder. This information related to the starting point of encryption for each slice can be sent in-band or out of band (OOB). The delivery of such information to the decryption system adds some complexity. In addition, the decryption system needs additional resources to process this extra information and perform decryption.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 5 illustrates a flowchart of a method for processing partially encrypted media packets in accordance with one non-limiting aspect of the present invention; and FIG. 6 illustrates a block diagram of a computing apparatus in accordance with one non-limiting aspect of the present invention.

DETAILED DESCRIPTION

Figure 1:
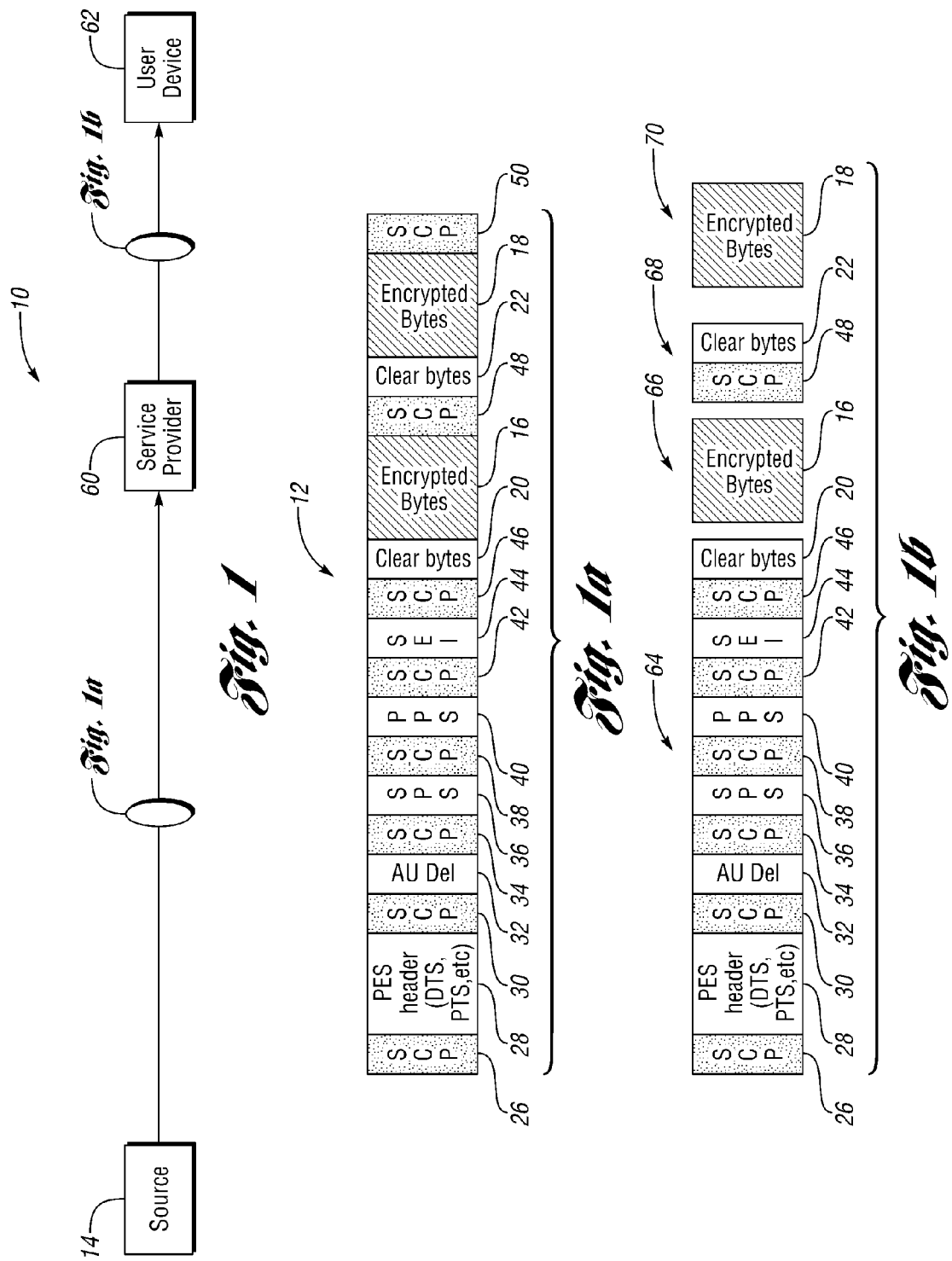
FIG. 1 illustrates a system for supporting transport of partially encrypted media in accordance with one non-limiting aspect of the present invention.

FIG. 1 illustrates a system 10 for supporting transport of partially encrypted media in accordance with one non-limiting aspect of the present invention. The system 10 is shown and described for exemplary purposes to support transport of video within partially encrypted advanced video coding (AVC) access units (AUs) that are encapsulated into a plurality of packetized elementary stream (PES) packets for transport within one or more transport stream (TS) packets 12. This, however, is done for exemplary purposes only and without intending to unnecessarily limit the scope and contemplation of the present invention as the present invention fully contemplates its use in supporting transport of any type of partially encrypted media.

The partially encrypted media shown within the illustrated packet 12 represents video transmitted from a source 14. While the packet is used to represent video, the present invention fully contemplates the packet 12, or a similar partially encrypted packet, being used to transport other types of data and media. The packet 12 may be characterized as a partially encrypted packet since it includes encrypted video slices 16, 18 and unencrypted, or clear, video slices 20, 22. A number of data slices 26, 28, 30, 32, 34, 36, 38, 40, 42, 44, 46, 48, 50 may be sandwiched around the sequence of video slices 16, 18, 20, 22 depending on a transport protocol used to support transmission of the packet 12, which for an exemplary and non-limiting aspect of the present invention is shown to be formatted according to MPEG.

While only packet 12 is shown, a number of packets 12 may be streamed or otherwise transported from the source 14 to support video/media playback in the event a run time of the video is greater than that which can be carried within one partially encrypted packet 12. In some cases, a length of each transmitted packet 12, which may be as measured as its total number of bytes, may be adjusted or otherwise adapted depending on image resolution, content conveyed within the image, and/or operating requirements of a device being used to facilitate playback. Optionally, other information and parameters, such as executing code (e.g., code/data used to support Enhanced TV Binary Interchange Format (EBIF) related applications and functions) may be included.

A service provider 60 or third party entity may be positioned downstream of the source 14 in accordance with one non-limiting aspect of the present invention to process or otherwise re-packetize the partially encrypted packet 12 prior to receipt by a user device 62 associated with a subscriber. The service provider 60 may be a multiple system operator (MSO) or other entity that provides electronic data dependent services to a plurality of user devices. The service provider 60 may include a computer, slicer, server, headend unit, mobile phone transceiver, or other element (not shown) having capabilities sufficient to manipulate the partially encrypted packet 12 into a greater number of fully encrypted and fully unencrypted packets 64, 66, 68, 70 as contemplated by one non-limiting aspect of the present invention.

The packets 64, 66, 68, 70 created by the service provider 60 may be comprised solely of encrypted video slices 16, 18 or unencrypted video slices 20, 22, referred to herein as fully encrypted packets 66, 70 and fully unencrypted packets 64, 68. The new, encrypted and unencrypted packets 64, 66, 68, 70 may be generated by re-packetizing or de-concatenating the packet 12 along boundaries defined relative to each of the encrypted and unencrypted video slices 16, 18, 20, 22 such that at least one new packet 64, 66, 68, 70 may be created to carry each video slice 16, 18, 20, 22 included within the partially encrypted packet 12.

Optionally, multiple packets may be created for the same video slice if a length of the video slice exceeds a threshold length or other desired length/size of the newly created packets 64, 66, 68, 70. The illustrated packet 12 is shown to be re-packetized into four packets 64, 66, 68, 70—one for each of the video slices 16, 18, 20, 22. The new packets 64, 66, 68, 70 may be, but need not necessarily be, created without the service provider 60 having to decrypt the encrypted video slices 16, 18. This may be facilitated by segmenting the packet 12 along boundaries defined by the encrypted and unencrypted video slices 16, 18, 20, 22, i.e., along boundaries defined to as occurring between data slices 46, 48, 50 adjoining video slices 16, 18, 20, 22 and successive video slices 16, 18, 20, 22.

These boundaries may be automatically detected by the slicer to facilitate an automated process for generating the new packets 64, 66, 68, 70. The slicer may be operable to read contents of each data slice 26, 28, 30, 32, 34, 36, 38, 40, 42, 44, 46, 48, 50 and video slice 16, 18, 20, 22 and to determine appropriate boundaries based on the information included therein. Optionally, the slicer may be configured to create at least one new packet for each video slice. While new packets 64, 66, 68, 70 may be generated for each video slice, all of the data slices 26, 28, 30, 32, 34, 36, 38, 40, 42, 44, 46, 48, 50 need not necessarily be included in the any one or more of the new packets 64, 66, 68, 70. As shown, some of the data slices 26, 28, 30, 32, 34, 36, 38, 40, 42, 44, 46, 48, 50 may be excluded from the re-packetized packets depending on the nature of the information included therein.

An automated process can be helpful in managing the time taken to re-packetize the partially encrypted packet 12, including the optional ability to support generation of more or less new packets depending on network congestion levels. Additional features may be added during the re-packetization process, such as to insert graphical ads and other content that would appear during playback of the new packets 64, 66, 68, 70. The new packets 64, 66, 68, 70 may be transmitted in a sequence that matches their order within the packet 12. Timestamps and other data slices/headers (not shown) may be added to each of the new packets 64, 66, 68, 70 to support transmission and organization relative to the sequence defined prior to re-packetization by the partially encrypted packet 12.

The illustrated partially encrypted packet 12 includes four separate video portions (two encrypted and two unencrypted) 16, 18, 20, 22, which may be referred to as a V number of video slices. The V number of video slices 16, 18, 20, 22 may be re-packetized in to P number of the new packets 64, 66, 68, 70. The exemplary illustration provided herein re-packetizes the V number of video slices into the same P number of packets 64, 66, 68, 70, i.e., V=P=4, although the present invention is not intended to be limited to this type of one-to-one conversion. The new packets 64, 66, 68, 70 are shown to be of varying length L as measured by the number of bytes comprising each packet 64, 66, 68, 70 (the larger packets are illustrates to have a larger horizontal length). The use of varying length packets 64, 66, 68, 70 may be helpful in limiting the number of bytes comprising each of the new packets 64, 66, 68, 70.

Figure 2:
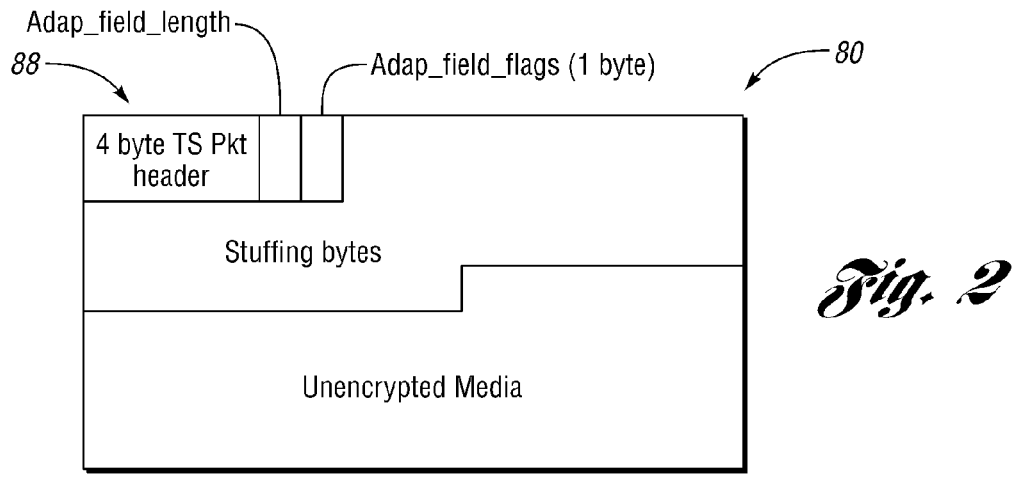
FIGS. 2-4 illustrate fixed-length packets generated in accordance with non-limiting aspects of the present invention.
Figure 3:
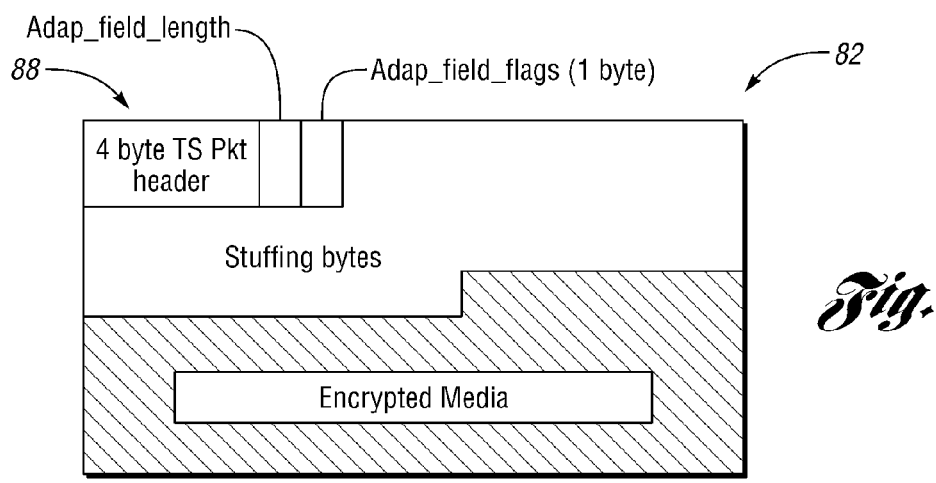
Figure 4:
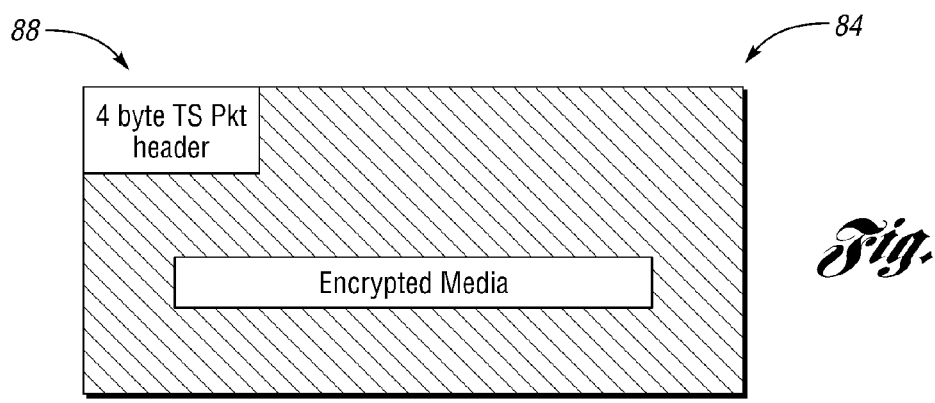

Optionally, instead of generating new packets 64, 66, 68, 70 at variable lengths, one non-limiting aspect of the present invention contemplates generating the new packets 64, 66, 68, 70 to include the same total X number of bytes. FIGS. 2-4 illustrate fixed-length packets 80, 82, 84 that can be generated in according with non-limiting aspects of the present invention. FIGS. 2 and 3 respectively illustrate fully unencrypted and encrypted data packets 80, 82 where an S number of stuffing bytes have been added as part of re-packetizing process to each of the packets 80, 82. The stuffing bytes may be data bytes and/or other non-video bytes.

The S number of bytes added to each packet may be individually selected depending on the size of the video slice included therein or other data slices that may be included therein. (Only video slices are shown in FIGS. 2 and 3 for exemplary purposes. The additional data slices and/or other non-illustrated pieces of data may be included with a corresponding addition of stuffing bytes.) The amount of stuffing bytes added to each packet 80, 82 may be tailored such that each of the new packets 80, 82 has the same X number of total bytes. For example, if the same X number of bytes is desired for each packet 80, 82, the S number of stuffing bytes added to each new packet may be based on the particular L value of each packet 80, 82 such that $S=X-L$.

FIG. 4 illustrates a scenario where the video slice (not shown) from which the illustrated packet 84 was generated had a length L which was equal to or greater than X number of bytes desired for the illustrated packet 84, i.e., where $L>X$ such that no stuffing bytes are required for the illustrated first one of the two packets. The second one of the packets (not shown) may require stuffing bytes in an amount equal to the remaining number of video bytes relative to desired X number of total bytes, i.e., $S=X-L$ where L equal the remaining number of video bytes, such that it would have a configuration similar to FIG. 2 or 3. The process of re-packetizing a single video slice into multiple packets can result in any number of packets being generated from a single video slice depending on the length of the video slice and the X threshold of total bytes per packet.

To facilitate the transmission and processing of the packets 80, 82, 84, a number of clear, unencrypted bytes may be included at a beginning of each packet 80, 82, 84 to transport data that can be used to identify whether the packet 80, 82, 84 includes encrypted or unencrypted video, the number and positioning of any stuffing bytes, and the number and positioning of any encrypted and unencrypted video bytes. In accordance with one non-limiting aspect of the present invention this data may be added to each packet 80, 82, 84 according the MPEG protocols by setting the necessary flags within a four byte packet header, and if necessary, within an adaptation field length and an adaptation field flag.

In the event the packet 80, 82, 84 includes encrypted media, the information included in the four byte header may identify digital rights and descrambling parameters needed to decode the encrypted video. The adaptation field length may be used to specify the location and/or the length of the stuffing bytes and omitted when stuffing bytes are not included. The adaptation field flag may be used to indicate timestamps, whether the video slices are I, B, or P frames, etc. Optionally, the adaptation field length and flag may occupy no more than one byte such that the stuffing bytes would have to added thereafter in the event additional bytes would be needed to properly size the packet.

FIG. 5 illustrates a flowchart 100 of a method for processing partially encrypted media packets in accordance with one non-limiting aspect of the present invention. The method is predominately described with respect to processing partially encrypted video packets of the type having encrypted video slices and unencrypted video slices. The description is provided for exemplary purposes and without intending to limited the scope and contemplation of the present invention to the re-packetization of video packets as the present invention may be suitable for use with other processing schemes where it may be advantageous to support the transmission of partially encrypted data packets.

Block 102 relates to receiving a partially encrypted video packet. The received packet may be considered as partially encrypted as long as it includes at least one unencrypted video slice and one encrypted video slice. The partially encrypted video packet may be received by a computer or other logically executing element having capabilities sufficient to support execution of some or all of the functions and process as necessary to implementing the operations contemplated by the present invention. Such a device may receive the partially encrypted video packet through wireless or wireline communication, such as over a cable, mobile phone, or satellite service network, and/or from a disc or other storage element.

Block 104 relates to identifying each of the one or more encrypted and unencrypted video slices, such as from data or other information included in a header or other portion of the partially encrypted video packet. Optionally, in the event the partially encrypted video packet fails to include information sufficient for the computer or other device receiving the partially encrypted video packet to self-identify the encrypted and unencrypted video slices, a server or other element may be relied upon to identify the video slices, such as through a look-up table or other cross-reference tool where a packet identifier of the partially encrypted video packet may be used to look-up or otherwise identifying the location of each video slice.

Block 106 relates to separating or otherwise de-concatenating each of the identified video slices into separate and independent video packets comprised wholly of encrypted or unencrypted video slices. This process may be characterized as a re-packetization process in that some or all of the video, data or other information in the partially encrypted video segment may be segmented or otherwise partitioned into a greater number of new packets, such as in the manner described above with respect to adding identifying information, and in some cases, stuffing bytes to the new packets. The process may be automated, such as to support playback of video where a plurality of partially encrypted video packets in the event the plurality of video packets are required to view the entire video.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

FIG. 6 illustrates a block diagram of a computing apparatus 120 configured to implement re-packetization of partially encrypted media packets in accordance with one non-limiting aspect of the present invention. It should be understood that the illustration of the computing apparatus 120 is a generalized illustration and that the computing apparatus 120 may include additional components and that some of the components described may be removed and/or modified without departing from a scope of the computing apparatus 120.

The computing apparatus 120 includes a main processor/controller 122 that may implement or execute some or all of the steps, functions, operations, and/or process described above. For example, the processor 122 may be configured to implement one or more programs stored in a memory 124 to classify feature vectors as described above.

Commands and data from the processor 122 are communicated over a communication bus 126. The computing apparatus 120 also includes a memory 128, such as a random access memory (RAM), where the program code for the processor 122 may be executed during runtime, and the memory 124. The memory 124 includes, for example, one or more hard disk drives 130 and/or a removable storage drive 132, representing a floppy diskette drive, a magnetic tape drive, a compact disk drive, etc.

User input 136 devices may include a keyboard, a mouse, and a touch screen display. A display 138 may receive display data from the processor 122 and convert the display data into display commands for the display 138. In addition, the processor(s) 122 may communicate over a network, for instance, the Internet, LAN, etc., through a network adaptor 140. The network adapter 140 may be operable to de-concatenate the encrypted and unencrypted video slices received within partially encrypted video packets. The processor 122 may instruct the network adaptor 140 to transmit the de-concatenated video slices in separate video packets, such as according to the process described above.

As supported above, one non-limiting aspect of the present invention relates a method of transporting partially encrypted AVC video slices using signaling resources of the MPEG-2 transport protocol. This may included identifying how many bytes are in clear or the location of starting byte of the encrypted part of the slice using MPEG-2 transport protocols and signaling. A PES packet containing an AVC video Access Unit which is randomly accessible in that it may include SPS NAL, PPS NAL, SEI NAL (optional) and two intra-coded slices.

One non-limiting aspect of the present invention presumes the cost to generate and transport the fully encrypted and fully unencrypted packets to be justified relative the costs associated with replacing or reconfiguring user devices or other devices to support decode of the partially encrypted packets.

One non-limiting aspect of the present contemplates delivering partially encrypted AVC video slices that are fully backward compatible with MPEG-2 transport compliant AVC set-top boxes/receivers and may not require any additional resources. The mapping contemplated by the present invention may add overhead to the transmitted data. The present invention is contemplated to be at least used for other video compression systems such as MPEG-2 video, VC-1 and MPEG-4 part 2 video that may use this type of partial encryption technique proposed in PIFF.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

What is claimed is:

1. A method of re-packetizing advanced video coding (AVC) access units (AUs) encapsulated into a plurality of packetized elementary stream (PES) packets, the method comprising:
   identifying video slices included within the plurality of packets as encrypted video slices and unencrypted video slices, each of the plurality of packets including both encrypted video slices and unencrypted video slices; and
   re-packetizing the plurality of packets into a number of re-packetized packets without decrypting the encrypted video slices, each re-packetized packet having one but not both of encrypted video slices and unencrypted video slices.

2. The method of claim 1 further comprising re-packetizing the plurality of packets such that the number of re-packetized packets is at least equal to the number of unencrypted and encrypted video slices.

3. The method of claim 1 wherein the number of the plurality of packets is equal to P number and the plurality of packets include a total X number of unencrypted and encrypted video slices, and the method further comprises re-packetizing the P number of packets into at least P*X number of re-packetized packets.

4. The method of claim 1 further comprising re-packetizing the plurality of packets such that each re-packetized packet includes the same total number of bytes.

5. The method of claim 4 further comprising adding stuffing bytes to one or more of the re-packetized packets such that each of the re-packetized packets has the same total number of bytes.

6. The method of claim 5 further comprising adding the stuffing bytes without including an adaptation field flag and an adaptation field length of more than one byte each.

7. The method of claim 1 further comprising setting flags within headers of each of the re-packetized packets that identify whether the video slices within that packet are encrypted or unencrypted video slices.

8. The method of claim 7 further comprising setting an adaptation field flag of no more than one byte within each re-packetized packet to indicate whether included video includes an I-frame, B-frame, and P-frame.

9. The method of claim 7 further comprising setting an adaptation field length within the re-packetized packets of no more than one byte to indicate a number of included stuffing bytes.

10. The method of claim 1 further comprising re-packetizing the plurality of packets according to MPEG-2.

11. The method of claim 10 further comprising identifying each unencrypted and encrypted video byte comprising the unencrypted and encrypted video slices with one or more data bytes included within each re-packetized packet according to MPEG-2 identifiers.

12. A computer-readable medium not including a signal and having stored thereon computer-executable instructions which when executed by a computer perform a method for re-packetizing partially encrypted video packets, the method comprising:
    identifying at least one encrypted video slice and at least one unencrypted video slice within each partially encrypted video packet, each of the partially encrypted video packets including both encrypted video slices and unencrypted video slices;
    de-concatenating each of the at least one encrypted video slice and the at least one unencrypted video slice into separate packets; and
    identifying whether decryption is needed to playback the separate packets with data included a beginning of each of the separate packets.

13. The computer-readable medium of claim 12 further comprising adding stuffing bytes to one or more of the separate packets such that each of the separate packets includes the same total number of bytes.

14. The computer-readable medium of claim 13 further comprising adding the stuffing bytes such that a header, an adaptation field, and an adaptation field flag of each of the separate packets has the same total number of bytes and without decrypting the at least one encrypted video slice.

15. A method of re-transmitting partially encrypted media packets, the method comprising: identifying encrypted media slices and unencrypted media slices included within the partially encrypted media packets, each of the partially encrypted media packets including both encrypted media slices and unencrypted media slices; generating at least one fully encrypted media packet for each of the encrypted media slices; generating at least one fully unencrypted media packet for each of the unencrypted media slices; and transmitting the fully encrypted and unencrypted media packets within a transport stream.

16. The method of claim 15 further comprising generating each of fully encrypted and fully unencrypted media packets to include a same X number of media bytes.

17. The method of claim 16 further comprising, for each fully encrypted and unencrypted media packet generated from media slices having V number of media bytes where V is less than X, adding S number of stuffing bytes to each of the fully encrypted and unencrypted media packets such that $S=X-V$.

18. The method of claim 16 further comprising, for each fully encrypted and unencrypted media packet generated from media slices having V number of media bytes, generating at least P number of fully encrypted and unencrypted media packets wherein P at least equals V/X.

19. The method of claim 15 further comprising generating at least two fully encrypted or two fully unencrypted media packets for at least one of the encrypted media slices and unencrypted media slices having a length that is greater than a threshold number of bytes, wherein each of the fully encrypted and fully unencrypted media packets have a length equal to the threshold number of bytes and are generated without decrypting the encrypted media slices.

20. The method of claim 15 further comprising including data defined according to MPEG-2 within a beginning of each fully encrypted and unencrypted media packet to identify whether each media packet includes fully encrypted or fully unencrypted media.

21. An apparatus operable to re-packetize partially encrypted video packets comprising:
a controller;
a computer-readable storage medium not including a signal and storing program code, which when executed by the controller, identifies encrypted video and unencrypted video slices included within each partially encrypted video packet, each of the partially encrypted video packets including both encrypted video slices and unencrypted video slices; and
a network interface operable to facilitate de-concatenating each encrypted and unencrypted video slice identified by the processor into separately transmitted packets comprised of one of encrypted and unencrypted video slices.

22. The apparatus of claim 21 wherein the separately transmitted packets each have the same total number of bytes.

23. The apparatus of claim 22 wherein stuffing bytes are added to the separately transmitted packets, if needed, to transmit the packets with the same total number of bytes.

24. The apparatus of claim 23 wherein the stuffing bytes are added without including an adaptation field flag and an adaptation field length of more than one byte each.

25. The apparatus of claim 21 wherein flags are included within headers of each separately transmitted packet to identify whether that packet includes encrypted or unencrypted video slices.

26. The apparatus of claim 25 wherein an adaptation field flag of no more than one byte is included within each separately transmitted packet to indicate an I-frame, B-frame, and P-frame.

27. The apparatus of claim 21 wherein the partially encrypted video packets are formatted according to MPEG-2.

* * * * *